Dec. 10, 1940.  O. W. GITHENS ET AL  2,224,383
FILM FOOTAGE INDICATOR
Original Filed April 7, 1937
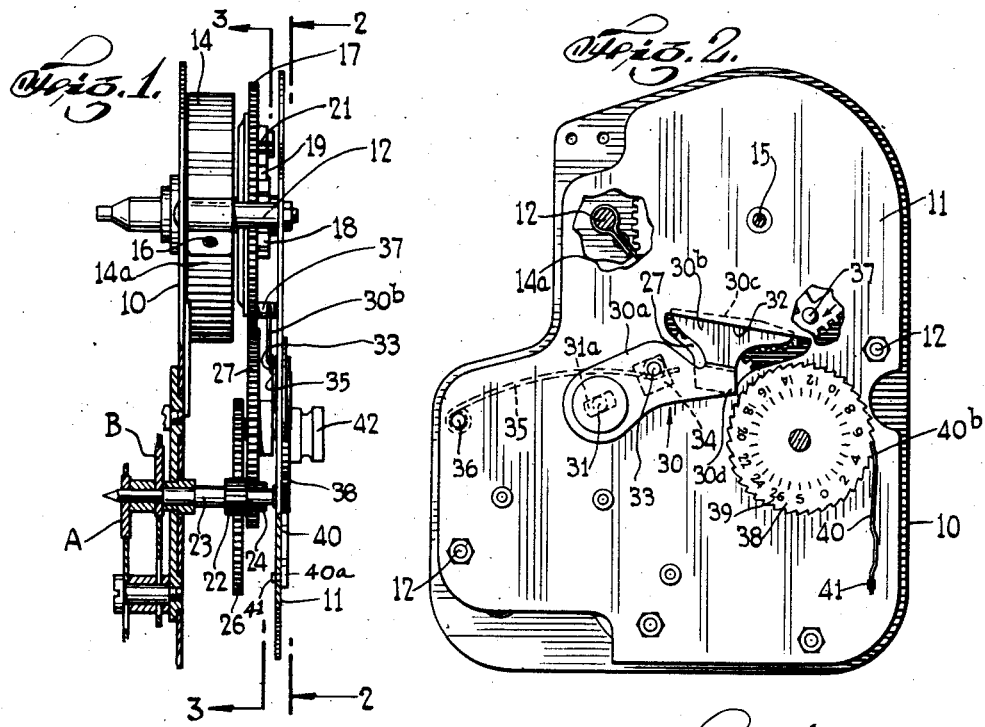
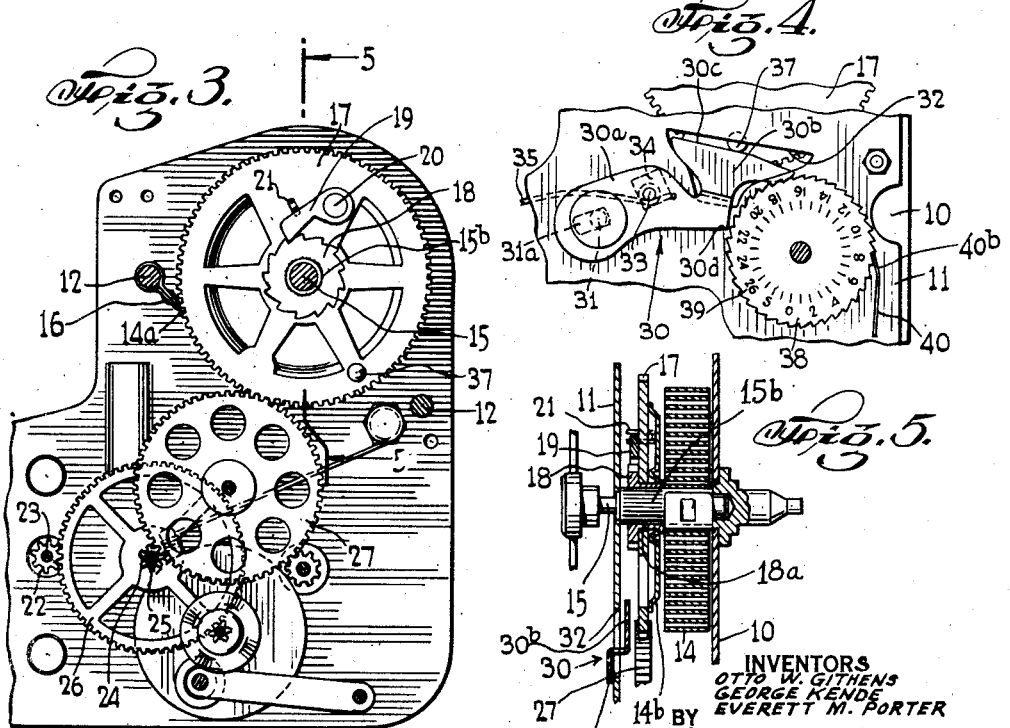

Patented Dec. 10, 1940

2,224,383

UNITED STATES PATENT OFFICE 2,224,383

FILM FOOTAGE INDICATOR

Otto W. Githens and George Kende, New York, and Everett M. Porter, Brooklyn, N. Y., assignors to Universal Camera Corporation, New York, N. Y., a corporation of Delaware Original application April 7, 1937, Serial No. 135,410. Divided and this application July 19, 1939, Serial No. 285,242

7 Claims. (Cl. 88—16)

This invention relates generally to motion picture cameras. More particularly, our invention relates to an improved footage meter construction for indicating the amount of unexposed film in a motion picture camera.

One of the objects of our invention is to provide, in a camera of the character described, a highly improved footage meter designed to operate in synchronism with the film advancing mechanism of the camera and to be operated by the camera motor.

Another object of our invention is to provide a footage meter mechanism for a motion picture camera which is characterized by its simplicity of construction and assembly, its ruggedness, and its highly efficient operation.

Other objects of our invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

Certain features shown and described but not claimed in this application are shown, described and claimed in our co-pending application, Serial No. 135,410, filed April 7, 1937, for Motion picture cameras, now Patent No. 2,174,155, of which the present application is a division.

In the accompanying drawing, in which is shown one of the various possible embodiments of this invention, Fig. 1 is a vertical cross-sectional view of the footage meter apparatus of a motion picture camera constructed in accordance with our invention and showing the motor mechanism for operating the same;

Fig. 2 is a cross-sectional view taken substantially on the line 2—2 of Fig. 1 with parts broken away;

Fig. 3 is a cross-sectional view taken substantially on the line 3—3 of Fig. 1;

Fig. 4 is a fragmentary view of a portion of the apparatus illustrated in Fig. 2 but showing a step in the operation thereof; and Fig. 5 is a cross-sectional view taken substantially on the line 5—5 of Fig. 3.

Referring now in detail to the drawing, there is disclosed a motion picture camera motor mechanism of the type fully shown in our co-pending application Serial No. 135,410, filed April 7, 1937. As described in the said co-pending application, the motor mechanism is housed between a pair of metallic plates 10 and 11 which are held in spaced relationship by a plurality of spacing rods 12. The said motor mechanism is adapted to be mounted in a suitable camera casing (not shown). The spring motor 14 comprises a flat spirally wound spring 14a, the inner end of which is fixed to a shaft 15, while the outer end thereof is looped over one of the spacer bars 12 and permanently held in position on such bar 12 by any suitable means, such as for example the rivet 16 shown in Figs. 2 and 3. The shaft 15 is suitably journaled between the plates 10 and 11. It is thus seen that rotation of the shaft 15 in a counter-clockwise direction will wind the spring 14a.

To prevent unwinding of the said motor spring 14a until such time as it is effectively used for driving a main driving gear 17 to operate the camera mechanism, there is provided a ratchet wheel 18 which is rigidly mounted on the shaft 15 for rotation therewith by any suitable means, such as for example by providing the shaft 15 with a knurled portion 15b and correspondingly knurling the opening in the ratchet 18 to provide easy and quick assembly. The ratchet 18 is provided with an extended collar portion 18a, upon which is rigidly fixed a spring guard plate 14b, which is designed to rotate with the ratchet 12. The gear 17 is so mounted on the collar 18a that the spring may be wound without rotating the said gear 17. Attached to the gear 17 is a pawl 19 pivotally mounted on a pivot 20 and adapted to cooperate with the ratchet wheel 18. The pawl 19 is normally urged in a direction to engage the teeth of the ratchet wheel 18 by means of a spring 21. It is thus seen that when the spring 14a unwinds to rotate the shaft 15 upon which it is mounted, the ratchet 18 will also rotate with the said shaft 15. The pawl 19, normally in engagement with the ratchet teeth and being fixed to the gear 17, will cause the rotation of the said gear 17 to drive the camera mechanism.

In mesh with a chain of gearing to be described is a pinion 22 (see Fig. 3) mounted on a shaft 23 for rotation therewith. On the said shaft 23 there is also mounted a pair of cams A and B for causing reciprocating motion of a pair of shuttles adapted to operate the intermittent film advancing claw and the film shutter, the function and operation of which is fully described and shown in our co-pending application Serial No. 121,488, filed January 21, 1937, now Patent No. 2,167,713. The shaft 23 has the opposite ends thereof journaled in the plates 10 and 11. The pinion 22 is adapted to be driven from the motor 14 by a gear 24 mounted on the shaft 25, the opposite ends of which are journaled in the plates 10 and 11. Also mounted on the shaft 25 for rotation therewith is a gear 26 which in turn meshes with the pinion 22. A gear 27, driven directly from the motor 14 by the gear 17, meshes with the pinion 24.

In accordance with our invention, the following mechanism has been provided for registering the amount of unexposed film remaining on the film spool, the said footage mechanism being adapted for use with and adapted to be operated by the above described motion picture camera motor.

The film footage meter comprises a member 30 which is pivotally mounted on the plate 11 by means of an enlarged headed fixed pivot 31. The said member 30 comprises a flat portion 30a thereof adapted to overlie the outer surface of the plate 11 and another portion 30b integral with the portion 30a but offset in a different plane therefrom so that the said portion 30b will overlie the opposite or inner surface of the plate 11. An opening 32 is provided in the plate 11 of suitable size and shape to permit the insertion of the portion 30b therethrough and to provide clearance for pivotal movement of the member 30. The amount of pivotal movement of the said member 30 is restricted by a pin projection 33 fixed to the portion 30a and designed to operate in an enlarged opening 34 in the plate 11. This opening is of such size with respect to the pin 33 as to permit a predetermined amount of pivotal movement of the member 30, for reasons which will soon become apparent. The member 30 is normally held in the limit of its counter-clockwise pivotal movement (see Fig. 2) by means of a spring 35, one end of which is attached to the plate 11 by an enlarged headed pin 36, while the free end of the spring 35 is designed to resiliently abut the pin 33, as shown, so as to normally urge the rotational movement of the member 30 in a counter-clockwise direction about the pivot 31. If desired, the pin 33 may be provided with an annular peripheral groove to retain the spring 35 in proper position. Designed for synchronous operation with the member 30 is a pin projection 37 mounted on the flat surface of the gear 17 for rotational movement therewith. The edge 30c of the portion 30b is cammed, as shown, and the projection 37 is disposed in the path of said cammed portion 30c, so that whenever the motor mechanism is in effective operation to rotate the gear 17, the pin 37, after making a complete revolution, will strike the cammed surface 30c and pivotally move the member 30 about its pivot 31 in a downward or clockwise direction, against the action of the spring 35 (see Fig. 4).

It is noted that a portion of the member 30 is provided with a substantially squared or pointed corner 30d, which is designed to cooperate with a rotatably mounted ratchet wheel 38 mounted on the plate 11. The teeth of the ratchet wheel 38 are so designed that, upon each revolution of the pin 37, the member 30 will be rotated in a clockwise direction, so that the portion 30d thereof will engage one of the teeth of the ratchet wheel 38 to turn said ratchet wheel in a counter-clockwise direction a predetermined distance. That portion of the member 30 adjacent the pivot 31 may be provided with a slotted aperture 31a surrounding the shank of the pivot 31, to permit sufficient inward sliding movement of the member 30 when the pin 37 engages the cammed surface 30c to permit the portion 30d to engage a tooth of the ratchet wheel 38 to rotate the same. Suitable markings 39 are provided on the top surface of the ratchet wheel 38, which are adapted to be visible through an aperture in the adjacent wall of the casing part (not shown) in which the motor unit is mounted. The number, visible through the outside of the casing, will register the number of feet of unexposed film. In the present design each revolution of the pin 37 will correspond to one foot of film used.

To prevent clockwise rotation of the ratchet wheel 38 and at the same time to hold the said wheel against undesired counter-clockwise rotational movement, there is provided a resilient member, such as a spring 40, one end 40a of which is attached to the plate 11 by any suitable attaching means, such as for example the downwardly projecting portion 41 of said spring 40 being received in a corresponding aperture in the plate 11 and swaged or weldedly held therein, while the other end 40b of the spring 40 resiliently contacts the ratchet teeth in such manner as to prevent rotation of said ratchet wheel 38 in a clockwise direction. A knurled knob member 42 may be provided on the ratchet wheel 38 in order to turn the same by hand to the proper starting point against the action of the spring 40 when the camera is first loaded.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. In a motion picture camera having a spring motor supported between a pair of plates, a footage meter mounted on one of said plates, said meter comprising a one-piece member pivotally and slidably mounted on said last named plate, a ratchet wheel rotatably mounted on said plate, said member comprising a first portion thereof overlying the outer surface of said plate, a second portion thereof overlying the inner surface of said plate and a third portion interconnecting the other two portions, said third portion passing through an aperture in said plate, and means associated with said motor for causing said member to rotate said ratchet wheel, said first and second portions being in planes parallel to each other and to the plane of said plate.

2. In a motion picture camera having a spring motor supported between a pair of plates, a footage meter mounted on one of said plates, said meter comprising a member pivotally and slidably mounted on said last named plate, a ratchet wheel rotatably mounted on said plate, said member comprising a first portion thereof normally overlying the outer surface of said plate, a second portion thereof normally overlying the inner surface of said plate and a third portion interconnecting the other two portions, said third portion passing through an aperture in said plate, means for normally maintaining said pivotally mounted member out of operative engagement with the teeth of said ratchet wheel, and means associated with said motor for causing said member to pivotally move into operative engagement with the teeth of said ratchet wheel to rotate said wheel whenever said motor is in operation and to slidably move during the rotational movement of said wheel.

3. In a motion picture camera having a spring motor supported between a pair of plates, a footage meter mounted on one of said plates, said meter comprising a member pivotally and slidably mounted on said last named plate, a ratchet wheel rotatably mounted on said plate, said member comprising a first flat portion thereof overlying the outer surface of said plate, a second flat portion thereof overlying the inner surface of said plate and a third portion angularly disposed with respect to and interconnecting the other two portions, said third portion passing through an aperture in said plate, means for normally maintaining said pivotally mounted member out of operative engagement with the teeth of said ratchet wheel, means associated with said motor for causing said pivotally mounted member to operatively engage the teeth of said ratchet wheel at predetermined intervals to intermittently rotate the said ratchet wheel and to slidably move during the rotational movement of said wheel.

4. In a motion picture camera having a spring motor supported between a pair of plates, a footage meter mounted on one of said plates, said meter comprising a member pivotally mounted on said last named plate, a ratchet wheel rotatably mounted on said plate, said member comprising a portion thereof overlying the outer surface of said plate, a portion thereof overlying the inner surface of said plate and a third portion interconnecting the other two portions, said third portion passing through an aperture in said plate, means for normally maintaining said pivotally mounted member out of operative engagement with the teeth of said ratchet wheel, means for causing said pivotally mounted member to operatively engage the teeth of said ratchet wheel at predetermined intervals to intermittently rotate the said ratchet wheel, said last named means comprising a rotatably mounted wheel driven by said motor and provided with a single projecting pin thereon, said pin being adapted upon each revolution of the said wheel to strike an edge of the said portion of said member overlying the inner surface of said plate, and a leaf spring on said plate tangentially disposed with respect to said wheel and having a portion thereof directly engaging the teeth of said wheel to prevent backward movement.

5. In a motion picture camera having a spring motor unit for operating the camera mechanism, means cooperating with said spring motor for visibly recording the number of feet of unexposed film, said means comprising a plate having an aperture, a one-piece member pivotally and slidably mounted on said plate, said member comprising a portion thereof overlying one surface of said plate, a second portion thereof overlying the opposite surface of said plate and a third portion interconnecting said first two portions, said third portion passing through said aperture, a ratchet wheel rotatably mounted on said plate and provided with indicia to indicate the amount of film unexposed, and means actuated by said spring motor to cause said pivoted member to intermittently engage the teeth of said ratchet wheel to rotate the said wheel a predetermined distance.

6. In a motion picture camera having a spring motor unit for operating the camera mechanism, means cooperating with said spring motor for visibly recording the number of feet of unexposed film, said means comprising a plate having an aperture, a one-piece member pivotally and slidably mounted on said plate, said member comprising a first portion thereof overlying one surface of said plate, a second portion thereof overlying the opposite surface of said plate and a third portion interconnecting said first two portions, said third portion passing through said aperture, said first and second portions being in planes parallel to each other and to the plane of said plate, a ratchet wheel rotatably mounted on said plate and provided with indicia to indicate the amount of film unexposed, means actuated by said spring motor to cause said pivoted member to intermittently engage the teeth of said ratchet wheel to rotate the said wheel a predetermined distance, and means for normally maintaining said pivoted member out of engagement with the teeth of said ratchet wheel.

7. In a motion picture camera having a spring motor unit for operating the camera mechanism, means cooperating with said spring motor for visibly recording the number of feet of unexposed film, said means comprising a plate having an aperture, a one-piece member pivotally mounted on said plate, said member comprising a portion thereof overlying one surface of said plate, a second portion thereof overlying the opposite surface of said plate and a third portion interconnecting said first two portions, said third portion passing through said aperture, said first and second portions being in planes parallel to each other and to the plane of said plate, a ratchet wheel rotatably mounted on said plate and provided with indicia to indicate the amount of film unexposed, means actuated by said spring motor to cause said pivoted member to intermittently engage the teeth of said ratchet wheel to rotate the said wheel a predetermined distance, means for normally maintaining said pivoted member out of engagement with the teeth of said ratchet wheel, said last named means comprising a spring fixed at one end thereof to said plate and having the other end thereof resiliently abutting a projecting pin on said member, and a leaf spring on said plate tangentially disposed with respect to said wheel and having a portion thereof directly engaging the teeth of said wheel to prevent backward movement.

OTTO W. GITHENS.
GEORGE KENDE.
EVERETT M. PORTER.